(12) United States Patent
Goji et al.

(10) Patent No.: US 9,586,113 B2
(45) Date of Patent: Mar. 7, 2017

(54) GOLF CLUB GRIP AND GOLF CLUB

(71) Applicant: DUNLOP SPORTS CO. LTD., Kobe-shi, Hyogo (JP)

(72) Inventors: Sho Goji, Kobe (JP); Chiemi Mikura, Kobe (JP); Kazuyoshi Shiga, Kobe (JP); Kuniyasu Horiuchi, Kobe (JP); Toshiyuki Tarao, Kobe (JP); Hidetaka Inoue, Kobe (JP); Hitoshi Oyama, Kobe (JP); Hiroshi Hasegawa, Kobe (JP)

(73) Assignee: Dunlop Sports Co. Ltd., Kobe-shi (JP)

( * ) Notice: Subject to any disclaimer, the term of this patent is extended or adjusted under 35 U.S.C. 154(b) by 0 days.

(21) Appl. No.: 14/928,311

(22) Filed: Oct. 30, 2015

(65) Prior Publication Data

US 2016/0121183 A1    May 5, 2016

(30) Foreign Application Priority Data

Oct. 31, 2014    (JP) ................. 2014-222844

(51) Int. Cl.
*A63B 60/08* (2015.01)
*A63B 53/14* (2015.01)
*C08L 21/00* (2006.01)

(52) U.S. Cl.
CPC .............. *A63B 60/08* (2015.10); *A63B 53/14* (2013.01); *C08L 21/00* (2013.01)

(58) Field of Classification Search
CPC ......... A63B 53/14; A63B 60/06; A63B 60/08; A63B 60/14
See application file for complete search history.

(56) References Cited

U.S. PATENT DOCUMENTS

| | | | | | |
|---|---|---|---|---|---|
| 4,819,939 | A | * | 4/1989 | Kobayashi | A63B 53/14 473/299 |
| 5,075,351 | A | * | 12/1991 | Joslyn | C08K 5/14 523/200 |
| 5,322,290 | A | * | 6/1994 | Minami | A63B 53/14 473/201 |
| 5,570,884 | A | * | 11/1996 | Carps | A63B 60/10 473/298 |
| 5,910,543 | A | * | 6/1999 | Patel | C08L 9/02 525/166 |

(Continued)

FOREIGN PATENT DOCUMENTS

JP        2012-110404 A        6/2012

*Primary Examiner* — Steven Wong
(74) *Attorney, Agent, or Firm* — Birch, Stewart, Kolasch & Birch, LLP (57) ABSTRACT

An object of the present invention is to provide a golf club grip comprising a layer containing a polar rubber and a layer containing a nonpolar rubber, and excellent in tensile strength. The present invention provides a golf club grip comprising a polar rubber layer and a nonpolar rubber layer, wherein the polar rubber layer is formed from a rubber composition containing a base rubber including a polar rubber in an amount of 50 mass % or more, the nonpolar rubber layer is formed from a rubber composition containing a base rubber including a nonpolar rubber in an amount of 50 mass % or more, the polar rubber layer and the nonpolar rubber layer are laminated via an interlayer formed from an interlayer composition containing an olefin rubber.

24 Claims, 2 Drawing Sheets

(56) References Cited

U.S. PATENT DOCUMENTS

| | | | | |
|---|---|---|---|---|
| RE37,702 E | * | 5/2002 | Huang | A63B 49/08 |
| | | | | 473/302 |
| 6,511,732 B1 | * | 1/2003 | Chao | A63B 49/08 |
| | | | | 15/143.1 |
| 8,966,809 B2 | * | 3/2015 | Huang | 43/18.1 R |
| 2009/0162651 A1 | * | 6/2009 | Rios | A43B 13/04 |
| | | | | 428/354 |
| 2010/0029827 A1 | * | 2/2010 | Ansems | B32B 27/08 |
| | | | | 524/451 |
| 2011/0165958 A1 | * | 7/2011 | Hachiro | A63B 53/14 |
| | | | | 473/300 |
| 2013/0096259 A1 | * | 4/2013 | Bett | C08L 75/04 |
| | | | | 525/185 |
| 2016/0121183 A1 | * | 5/2016 | Goji | A63B 53/14 |
| | | | | 473/300 |
| 2016/0136491 A1 | * | 5/2016 | Inoue | A63B 53/14 |
| | | | | 473/300 |
| 2016/0136492 A1 | * | 5/2016 | Mikura | A63B 53/14 |
| | | | | 473/300 |

* cited by examiner

GOLF CLUB GRIP AND GOLF CLUB

FIELD OF THE INVENTION

The present invention relates to a golf club grip.

DESCRIPTION OF THE RELATED ART

As a grip provided on a golf club, a rubber grip is frequently utilized. In such a rubber grip, a double construction employing materials having different physical properties has been proposed for the purpose of imparting desired functions.

For example, Japanese Patent Publication No. 2012-110404 A discloses a golf club grip having a double construction comprising a cylindrical inner made of rubber, and a cylindrical outer made of rubber covering the cylindrical inner and having a lower hardness than the cylindrical inner, wherein the cylindrical inner is formed in a length 1 to 4 cm longer than a half of the entire length of the grip, and formed harder than the cylindrical outer; a plurality of longitudinal projecting strips are formed on the outer peripheral surface of the cylindrical inner at a fixed interval in the circumferential direction, and extended from a proximal end side to a portion of 70% to 80% of the entire length of the cylindrical inner along the axis line direction; a plurality of circumferential grooves are formed at a fixed interval in the axis line direction, on the outer peripheral surface of a portion of the cylindrical outer covering a portion having the longitudinal projecting strips formed; and a plurality of longitudinal grooves are formed on the outer peripheral surface of the cylindrical outer at the distal end side than the circumferential grooves (refer to claim 1 of Japanese Patent Publication No. 2012-110404 A).

SUMMARY OF THE INVENTION

An object of the present invention is to provide a golf club grip comprising a layer containing a polar rubber and a layer containing a nonpolar rubber, and having an excellent tensile strength.

The golf club grip according to the present invention that can solve the above problems comprises a polar rubber layer and a nonpolar rubber layer, wherein the polar rubber layer is formed from a rubber composition containing a base rubber including a polar rubber in an amount of 50 mass % or more, the nonpolar rubber layer is formed from a rubber composition containing a base rubber including a nonpolar rubber in an amount of 50 mass % or more, the polar rubber layer and the nonpolar rubber layer are laminated via an interlayer formed from an interlayer composition containing an olefin rubber. If the polar rubber layer and the nonpolar rubber layer are comprised, the flexibility in designing grip physical properties is increased. In addition, if the interlayer employing the olefin rubber is interposed between the polar rubber layer and the nonpolar rubber layer, adhesion strength between the polar rubber layer and the nonpolar rubber layer can be enhanced without lowering tensile strength of the grip.

The present invention also provides a golf club comprising a shaft, a head provided on one end of the shaft, and a grip provided on another end of the shaft, wherein the grip is the above-described golf club grip.

According to the present invention, a golf club grip comprising a layer containing a polar rubber and a layer containing a nonpolar rubber, and having an excellent tensile strength is obtained.

DESCRIPTION OF THE PREFERRED EMBODIMENT

The golf club grip according to the present invention comprises a polar rubber layer and a nonpolar rubber layer, wherein the polar rubber layer is formed from a rubber composition containing a base rubber including a polar rubber in an amount of 50 mass % or more, the nonpolar rubber layer is formed from a rubber composition containing a base rubber including a nonpolar rubber in an amount of 50 mass % or more, the polar rubber layer and the nonpolar rubber layer are laminated via an interlayer formed from an interlayer composition containing an olefin rubber. The polar rubber layer and the nonpolar rubber layer have different physical properties from each other. Therefore, the grip comprising the polar rubber layer and the nonpolar rubber layer has increased flexibility in designing physical properties thereof, compared to a grip consisting of a single layer of the polar rubber or the nonpolar rubber. In addition, if the interlayer employing the olefin rubber is interposed between the polar rubber layer and the nonpolar, rubber layer, adhesion strength between the polar rubber layer and the nonpolar rubber layer can be enhanced without lowering tensile strength of the grip.

(Polar Rubber)

The polar rubber composition used in the polar rubber layer contains a base rubber including a polar rubber, and a crosslinking agent. The amount of the polar rubber in the base rubber is 50 mass % or more, preferably 60 mass % or more, more preferably 70 mass % or more. As the base rubber, the polar rubber composition may further contain a nonpolar rubber, but preferably contains only the polar rubber. The polar rubber is a rubber having a SP (solubility parameter) value of 8.7 or more and 10.5 or less.

The SP value is a value ($Pa^{1/2}$ (25° C.)) calculated according to Fedors' formula (the following mathematical formula (1)) (Polymer Engineering and Science, Vol 14, No. 2, 1974, p 147).

$$\text{SP value} = (\Delta E/V)^{1/2} = (\Sigma \Delta ei / \Sigma \Delta vi)^{1/2} \quad (1)$$

[In the formula (1), $\Delta E$ represents vaporization energy, V represents mole volume, $\Delta ei$ represents vaporization energy of an atom or an atomic group, and $\Delta vi$ represents mole volume of an atom or an atomic group.]

Examples of the polar rubber include a diene rubber such as an acrylonitrile-butadiene rubber (NBR), a carboxyl-modified acrylonitrile-butadiene rubber (XNBR), a hydrogenated acrylonitrile-butadiene rubber (HNBR), and a hydrogenated carboxyl-modified acrylonitrile-butadiene rubber (HXNBR); and a non-diene rubber such as acrylic rubber and urethane rubber. Among them, the diene rubber is preferred. The amount of the diene rubber in the polar rubber is preferably 50 mass % or more, more preferably 60 mass % or more. It is also preferred that the diene rubber is used solely as the polar rubber. As the polar rubber, NBR, XNBR, HNBR and HXNBR are more preferred.

XNBR is a copolymer of a monomer having a carboxyl group, acrylonitrile and butadiene. HNBR is a hydrogenated product of acrylonitrile-butadiene rubber.

In NBR, XNBR, HNBR and HXNBR, the amount of acrylonitrile is preferably 15 mass % or more, more preferably 18 mass % or more, even more preferably 21 mass % or more, and is preferably 50 mass % or less, more preferably 45 mass % or less, even more preferably 40 mass % or less. If the amount of acrylonitrile is 15 mass % or more, the grip shows better abrasion resistance, and if the amount of acrylonitrile is 50 mass % or less, the grip shows better touch feeling in a cold region or winter.

In HNBR and HXNBR, the amount of double bond is preferably 0.09 mmol/g or more, more preferably 0.2 mmol/g or more, and is preferably 2.5 mmol/g or less, more preferably 2.0 mmol/g or less, even more preferably 1.5 mmol/g or less. If the amount of double bond is 0.09 mmol/g or more, vulcanization is easily carried out during molding and the grip shows enhanced tensile strength, and if the amount of double bond is 2.5 mmol/g or less, the grip shows better durability (weather resistance) and tensile strength. The amount of double bond can be adjusted by the amount of butadiene in the copolymer or the amount of hydrogen added into the copolymer.

As the monomer having a carboxyl group in XNBR and HXNBR, acrylic acid, methacrylic acid, fumaric acid, and maleic acid are exemplified. In XNBR and HXNBR, the amount of the monomer having a carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the amount of the monomer having a carboxyl group is 1.0 mass % or more, the grip shows better abrasion resistance, and if the amount of the monomer having a carboxyl group is 30 mass % or less, the grip shows better touch feeling in a cold region or winter.

In XNBR and HXNBR, the amount of the carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the amount of the carboxyl group is 1.0 mass % or more, the grip shows better abrasion resistance, and if the amount of the carboxyl group is 30 mass % or less, the grip shows better touch feeling in a cold region or winter.

(Nonpolar Rubber)

The nonpolar rubber composition used in the nonpolar rubber layer contains a base rubber including a nonpolar rubber, and a crosslinking agent. The amount of the nonpolar rubber in the base rubber is 50 mass % or more, preferably 60 mass % or more, more preferably 70 mass % or more. As the base rubber, the nonpolar rubber composition may further contain a polar rubber, but preferably contains only the nonpolar rubber. The nonpolar rubber is a rubber having SP value of 7.7 or more and less than 8.7.

Examples of the nonpolar rubber include a diene rubber such as isoprene rubber (IR), butadiene rubber (BR), styrene-butadiene rubber (SBR), chloroprene rubber (CR), and natural rubber (NR); and a non-diene rubber such as ethylene-propylene rubber (EPM), ethylene-propylene-diene rubber (EPDM), and butyl rubber (IIR). Among them, the diene rubber is preferred. The amount of the diene rubber in the nonpolar rubber is preferably 50 mass % or more, more preferably 60 mass % or more. It is also preferred that the diene rubber is used solely as the nonpolar rubber. As the nonpolar rubber, NR, EPDM and SBR are more preferred.

Next, the common materials used in the polar rubber composition and the nonpolar rubber composition will be described. As the crosslinking agent, a sulfur crosslinking agent and an organic peroxide can be used. Examples of the sulfur crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis(t-butylperoxy-m-diisopropyl)benzene, 2,5-dimethyl-2,5-di(t-butylperoxy)hexane, and 1,1-bis(t-butylperoxy)-3,3,5-trimethylcyclohexane. The crosslinking agent may be used solely, or two or more of them may be used in combination. As the crosslinking agent, the sulfur crosslinking agent is preferred, and the elemental sulfur is more preferred. The amount of the crosslinking agent is preferably 0.2 part by mass or more, more preferably 0.4 part by mass or more, even more preferably 0.6 part by mass or more, and is preferably 4.0 parts by mass or less, more preferably 3.5 parts by mass or less, even more preferably 3.0 parts by mass or less, with respect to 100 parts by mass of the base rubber.

The rubber composition preferably further contains a vulcanization accelerator or a vulcanization activator.

Examples of the vulcanization accelerator include thiurams such as tetramethylthiuram disulfide (TMTD), tetramethylthiuram monosulfide (TMTM), dipentamethylenethiuram tetrasulfide, and tetrabenzylthiuram disulfide (TBzTD); guanidines such as diphenylguanidine (DPG); dithiocarbamates such as zinc dimethyldithiocarbamate (Zn-PDC), and zinc dibutyldithiocarbamate; thioureas such as trimethylthiourea, and N,N'-diethylthiourea; thiazoles such as mercaptobenzothiazole (MBT), and benzothiazole disulfide; sulfenamides such as N-cyclohexyl-2-benzothiazolylsulfenamide (CBS), and N-t-butyl-2-benzothiazolylsulfenamide (BBS); and the like. These vulcanization accelerators may be used solely, or two or more of them may be used in combination.

The amount of the vulcanization accelerator is preferably 0.4 part by mass or more, more preferably 0.8 part by mass or more, even more preferably 1.2 parts by mass or more, and is preferably 8.0 parts by mass or less, more preferably 7.0 parts by mass or less, even more preferably 6.0 parts by mass or less, with respect to 100 parts by mass of the base rubber.

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination.

The amount of the vulcanization activator is preferably 0.5 part by mass or more, more preferably 0.6 part by mass or more, even more preferably 0.7 part by mass or more, and is preferably 10.0 parts by mass or less, more preferably 9.5 parts by mass or less, even more preferably 9.0 parts by mass or less, with respect to 100 parts by mass of the base rubber.

The rubber composition may further contain a reinforcing material, an antioxidant, a softening agent, a vulcanization retardant, a coloring agent, and the like where necessary.

Examples of the reinforcing material include carbon black and silica. The amount of the reinforcing material is preferably 2.0 parts by mass or more, more preferably 3.0 parts by mass or more, even more preferably 4.0 parts by mass or more, and is preferably 50 parts by mass or less, more preferably 45 parts by mass or less, even more preferably 40 parts by mass or less, with respect to 100 parts by mass of the base rubber.

Examples of the antioxidant include imidazoles, amines and phenols. Examples of the imidazoles include nickel dibutyldithiocarbamate (NDIBC), 2-mercaptobenzimidazole, and zinc salt of 2-mercaptobenzimidazole. Examples of the amines include phenyl-α-naphthylamine. Examples of the phenols include 2,2'-methylene bis(4-methyl-6-t-butylphenol) (MBMBP), and 2,6-di-tert-butyl-4-methylphenol. These antioxidants may be used solely, or two or more of them may be used in combination. The amount of the antioxidant is preferably 0.2 part by mass or more, more preferably 0.3 part by mass or more, even more preferably 0.4 part by mass or more, and is preferably 5.0 parts by mass or less, more preferably 4.8 parts by mass or less, even more preferably 4.6 parts by mass or less, with respect to 100 parts by mass of the base rubber.

Examples of the vulcanization retardant include an aromatic carboxylic acid such as benzoic acid, phthalic anhydride, salicylic acid, and acetylsalicylic acid; a nitroso compound such as N-nitrosodiphenylamine; and N-cyclohexylthio phthalimide. The amount of the vulcanization retardant is preferably 0.1 part by mass or more, more preferably 0.2 part by mass or more, even more preferably 0.3 part by mass or more, and is preferably 1.0 part by mass or less, more preferably 0.9 parts by mass or less, even more preferably 0.8 parts by mass or less, with respect to 100 parts by mass of the base rubber.

Examples of the softening agent include a mineral oil and a plasticizer. Examples of the mineral oil include paraffin oil, naphthene oil, aromatic oil, and process oil. Examples of the plasticizer include dioctyl phthalate, dibutyl phthalate, dioctyl sebacate, and dioctyl adipate.

The rubber composition can be prepared by a conventionally known method, for example, by kneading raw materials using a kneading machine such as a Banbury mixer, kneader, and open roll. The temperature (material temperature) for kneading preferably ranges from 90° C. to 160° C.

(Interlayer Composition)

The interlayer composition contains an olefin rubber. Examples of the olefin rubber include an ethylene-propylene rubber (EPM), an ethylene-propylene-diene rubber (EPDM), a butyl rubber (IIR), a chiorosulfonated polyethylene (CSM), a maleic acid modified ethylene-propylene rubber (M-EPM), and a chlorinated polyethylene rubber (CM). The amount of the olefin rubber in the rubber component employed in the interlayer composition is preferably 50 mass % or more.

As the olefin rubber, a modified olefin rubber is preferred. Examples of the modified olefin rubber include the chlorosulfonated polyethylene (CSM), maleic acid modified ethylene-propylene rubber (M-EPM), and chlorinated polyethylene rubber (CM).

The amount of the modified polyethylene in the modified olefin rubber is preferably 5 mass % or more, more preferably 7 mass % or more, even more preferably 10 mass % or more, and is preferably 15 mass % or less, more preferably 12 mass % or less, even more preferably 10 mass % or less. If the amount of the modified polyethylene is 5 mass % or more, peeling strength between the inner layer and the outer layer is enhanced, and if the amount of the modified polyethylene is 15 mass % or less, the lowering in tensile strength of the grip is suppressed.

As the olefin rubber, chiorosulfonated polyethylene is particularly preferred. The above chlorosulfonated polyethylene can be obtained by chlorosulfonating polyethylene, and represented by the following chemical formula (1).

[In the formula, I, m and n represent a ratio (mass %) of each repeating unit.]

The interlayer composition preferably contains 4,4'-diphenylmethane diisocyanate (MDI). If MDI is contained, peeling strength between the inner layer and the outer layer is further enhanced. The content of MDI is preferably more than 0 mass %, more preferably 1 mass % or more, even more preferably 2 mass % or more, and is preferably 6 mass % or less, more preferably 5 mass % or less, even more preferably 4 mass % or less.

The interlayer composition may contain a solvent. If the solvent is contained, the interlayer can be formed more thinly, and tensile strength of the grip can be further enhanced. Examples of the solvent include an organic solvent such as xylene and toluene. When the solvent is contained, the concentration of solid components (the concentration of the components except the solvent) in the interlayer composition preferably ranges from 10 mass % to 30 mass %. In addition, the interlayer composition may contain a filler (carbon black, silica, or the like).

The golf club grip according to the present invention comprises the polar rubber layer, the nonpolar rubber layer, and the interlayer, wherein the polar layer and the nonpolar rubber layer are laminated via the interlayer. That is, the interlayer is interposed between the polar rubber layer and the nonpolar rubber layer. The interlayer is preferably disposed in an area of 50% or more of the area of the lamination interface between the polar rubber layer and the nonpolar rubber layer, more preferably disposed in an area of 60% or more of the area of the lamination interface between the polar rubber layer and the nonpolar rubber layer, even more preferably disposed in an area of 70% or more of the area of the lamination interface between the polar rubber layer and the nonpolar rubber layer. It is preferred that the interlayer is disposed throughout the entire lamination interface between the polar rubber layer and the nonpolar rubber layer.

Examples of the embodiment laminating each layer include, in a laminating order from the inner side outward, nonpolar rubber layer/interlayer/polar rubber layer, polar rubber layer/interlayer/nonpolar rubber layer, nonpolar rubber layer/interlayer/polar rubber layer/interlayer/nonpolar rubber layer, and polar rubber layer/interlayer/nonpolar rubber layer/interlayer/polar rubber layer. Among them, the embodiment using the nonpolar rubber for the inner layer and using the polar rubber for the outer layer (nonpolar rubber layer/interlayer/polar rubber layer) is preferred.

The shape of the golf club grip according to the present invention is not particularly limited, and a conventionally known shape can be adopted. Examples of the shape of the grip include a shape having a cylindrical part for inserting a shaft and an integrally molded cap part for covering the opening of the back end of the cylindrical part. At least a part of the cylindrical part has the lamination construction of the polar rubber layer and the nonpolar rubber layer. It is preferred that the entire cylindrical part has the lamination construction of the polar rubber layer and the nonpolar rubber layer.

The cylindrical part may be formed to have a fixed thickness along the axis direction, or may be formed to have a thickness gradually becoming thicker from the front end part toward the back end part. In addition, the cylindrical part may be formed to have a fixed thickness along the diameter direction, or a projecting strip part (so-called back line) may be formed on a part of the cylindrical part. Furthermore, a groove may be formed on the surface of the cylindrical part. Formation of a water film between the hand of the golfer and the grip may be suppressed by the groove, and thus grip performance in a wet condition is further enhanced. In addition, in view of anti-slip performance and abrasion resistance of the grip, a reinforcing cord may be arranged in the grip.

The golf club grip can be obtained by molding the rubber composition in a mold. Examples of the molding method include press molding and injection molding. In the case of utilizing press molding, the temperature of the mold preferably ranges from 140° C. to 200° C., the molding time preferably ranges from 5 minutes to 45 minutes, and the molding pressure preferably ranges from 0.1 MPa to 100 MPa. Examples of the press molding method include a method of charging the polar rubber composition, interlayer composition and nonpolar rubber composition into the mold followed by performing press molding; a method of molding the nonpolar rubber layer (inner layer) using the nonpolar rubber composition followed by laminating the interlayer composition and polar rubber composition on the nonpolar rubber layer and performing press molding; and the like.

The golf club according to the present invention comprises a shaft, a head provided on one end of the shaft, and a grip provided on another end of the shaft, wherein the grip is formed from the above-described rubber composition. The shaft can be made of stainless steel or a carbon fiber reinforcing resin. Examples of the head include wood type, utility type, and iron type. The material constituting the head is not particularly limited, and examples thereof include titanium, a titanium alloy, a carbon fiber reinforcing plastic, stainless steel, maraging steel, and soft iron.

Figure 1:
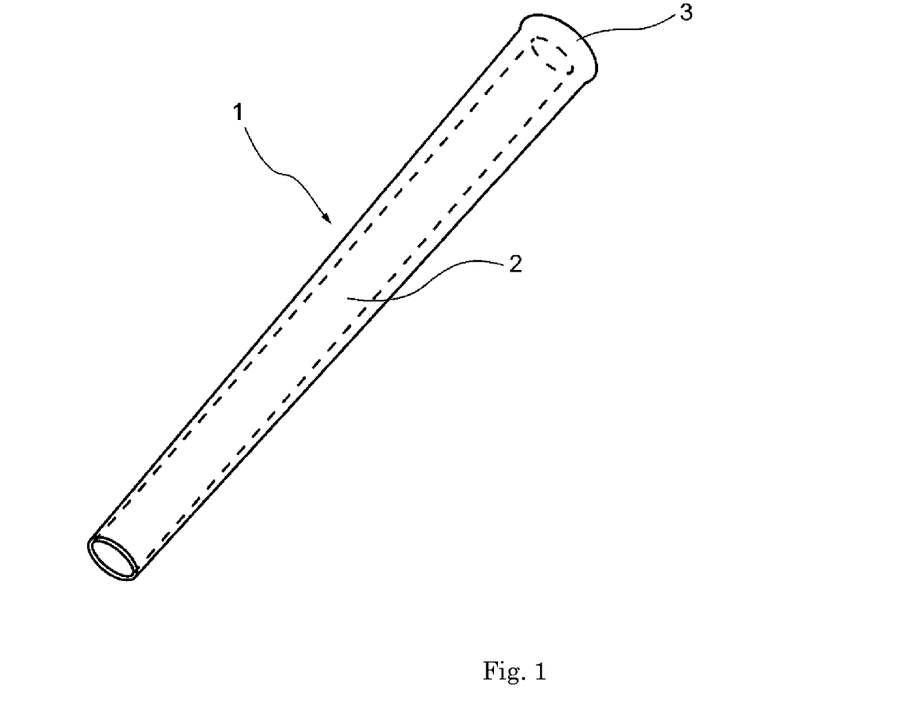
FIG. 1 is a perspective view showing one example of the golf club grip according to the present invention.

Next, the golf club grip and the golf club according to the present invention will be explained with reference to figures. FIG. 1 is a perspective view showing one example of the golf club grip according to the present invention. A grip 1 comprises a cylindrical part 2 for inserting a shaft, and an integrally molded cap part 3 for covering the opening of the back end of the cylindrical part.

Figure 2:
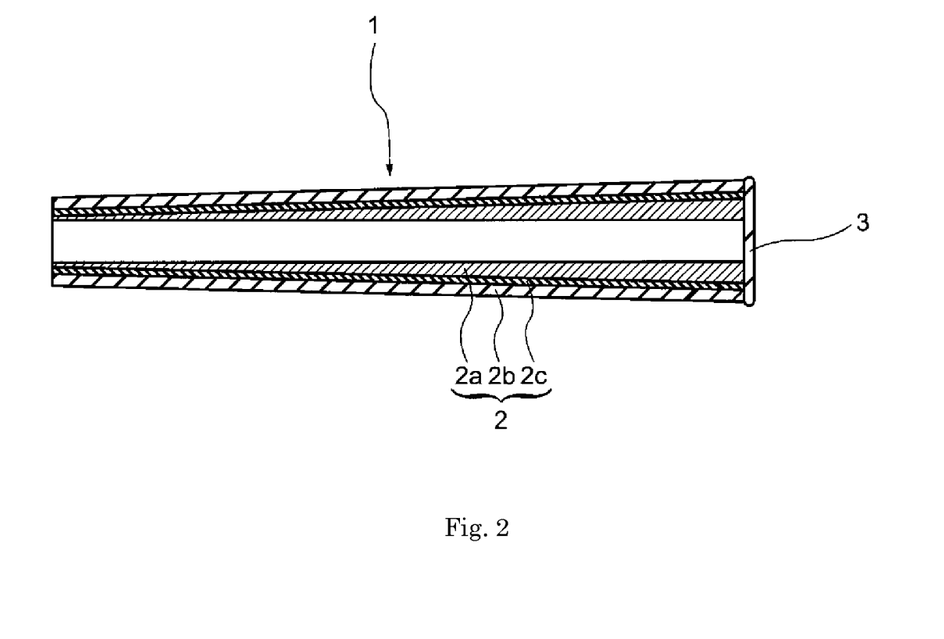
FIG. 2 is a schematic cross-section view showing one example of the golf club grip according to the present invention.

FIG. 2 is a schematic cross-section view showing one example of the golf club grip according to the present invention. The cylindrical part 2 has a multilayer construction comprising an inner layer 2a, an outer layer 2b and an interlayer 2c disposed therebetween throughout the entire longitudinal direction thereof. The outer layer 2b and interlayer 2c are formed to have a uniform thickness throughout the entire region from the front end part to the back end part. The inner layer 2a is formed to have a thickness gradually becoming thicker from the front end part toward the back end part. In the grip 1 shown in FIG. 2, the inner layer 2a is the nonpolar rubber layer, the outer layer 2b is the polar rubber layer, and the cap part 3 is formed from a polar rubber composition same as that of the outer layer 2b.

Figure 3:
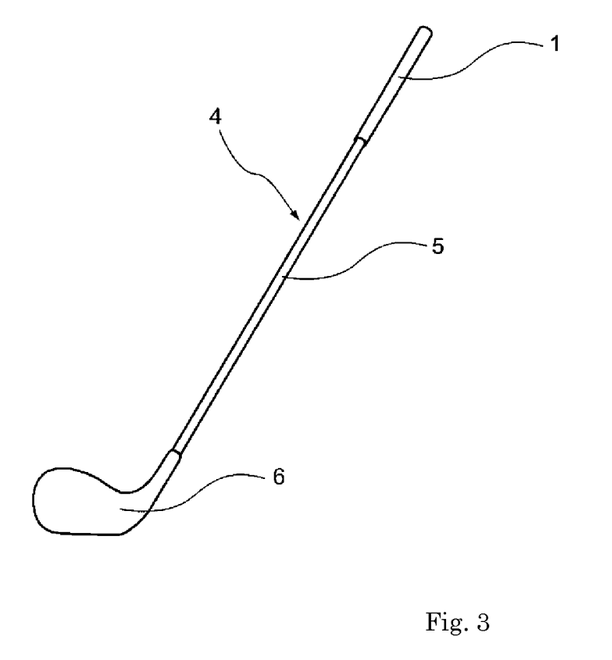
FIG. 3 is a perspective view showing one example of the golf club according to the present invention.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical part 2 of the grip 1.

EXAMPLES

Hereinafter, the present invention will be described in detail by way of examples. However, the present invention is not limited to the examples described below, and various changes and modifications can be made in accordance with the spirit of the present invention and are included in the technical scope of the present invention.

[Evaluation Method]

(1) Peeling Strength

Peeling strength (peeling adhesion strength) was measured according to JIS K 6854-2 (1999) (180 degree peeling). Specifically, unvulcanized rubber sheets (thickness: 2 mm) were prepared using the nonpolar rubber composition and the polar rubber composition, respectively. Samples with a width of 25 mm and a length of 150 mm were cut from the sheets. The interlayer composition was applied to the entire region from one end of the polar rubber sheet sample in the longitudinal direction to a portion at a distance of 120 mm from the end, and the nonpolar rubber sheet sample was laminated thereon. The obtained laminated product was heat pressed (molding temperature: 160° C., molding time: 15 minutes, pressure: 14.7 MPa) to vulcanize the polar rubber and nonpolar rubber, and a test piece with a thickness of 4 mm, a width of 25 mm and a length of 150 mm was obtained.

The nonpolar rubber layer and polar rubber layer on the portion of the obtained test piece where the interlayer was not formed were peeled, and the peeling test was carried out (measurement temperature: 23° C., moving speed: 100 mm/min) using a tensile test measurement apparatus (Autograph AGS-D manufactured by SHIMADZU Corporation). The force of peeling the nonpolar rubber layer and polar rubber layer in a distance range of 25 mm to 125 mm from the end of the adhesion interface was recorded, and ultimate peeling force in this range was calculated. It is noted that peeling strength of Grip No. 2 was defined as an index of 100, and peeling strength is a value represented by converting peeling strength into this index.

(2) Tensile Strength

Tensile strength was measured according to JIS K 6251 (2010). Specifically, a sample with a thickness of 2 mm was cut from the polar rubber layer side of the grip. The sample was punched into a dumbbell shape (Dumbbell shape No. 3) to prepare a test piece, and physical properties of the test piece were measured (measurement temperature: 23° C., tensile speed: 500 mm/min) using a tensile test measurement apparatus (Autograph AGS-D manufactured by SHIMADZU Corporation). Then, tensile strength was calculated by dividing ultimate tensile force recorded until the time the test piece was broken by the initial cross-sectional area of the test piece. It is noted that tensile strength of Grip No. 1 was defined as an index of 100, and tensile strength is a value represented by converting tensile strength into this index.

[Production of Grip]

Materials having the formulations shown in Table 1 were mixed and kneaded with a Banbury mixer (material temperature: 150° C.) to prepare rubber compositions.

TABLE 1

|  |  |  | Nonpolar rubber composition | | | | Polar rubber composition | | |
|---|---|---|---|---|---|---|---|---|---|
| Rubber composition No. | | | a | b | c | d | A | B | C |
| Base rubber | Nonpolar rubber | NR | 70 | 100 | — | — | — | — | — |
|  |  | EPDM | 30 | — | 100 | — | — | — | — |
|  |  | SBR | — | — | — | 100 | — | — | — |
|  | Polar rubber | HXNBR | — | — | — | — | 100 | 50 | — |
|  |  | HNBR | — | — | — | — | — | 50 | 100 |
| Crosslinking agent | Sulfur | Powdery sulfur | 2 | | | | 1.5 | | |
| Vulcanization accelerator | CBS | NOCCELER CZ | 1 | | | | — | | |
|  | BBS | NOCCELER NS | 1 | | | | — | | |
|  | DPG | SOXINOL D (DPG) | 1 | | | | — | | |
|  | TBzTD | SANCELER TBzTD | — | | | | 3 | | |
| Vulcanization activator | Zinc oxide | WHITE SEAL | 3 | | | | — | | |
|  | Zinc peroxide | STRUKTOL ZP 1014 | — | | | | 5 | | |
|  | Fatty acid | Stearic acid | 1 | | | | 1 | | |
| Reinforcing material | Silica | ULTRASIL VN3 | 8 | | | | — | | |
|  | Carbon black | DIABLACK N220 | 4 | | | | — | | |
|  |  | SEAST SO (FEF) | — | | | | 5 | | |
| Antioxidant | MBMBP | NOCRAC NS-6 | 0.5 | | | | — | | |
| Vulcanization retardant | CTPI | SANTOGARD PVI | 0.3 | | | | — | | |
|  | Aromatic fatty acid | Benzoic acid | 0.5 | | | | — | | |
| Softening agent | Mineral oil | Diana Process Oil PA32 | 2 | | | | — | | |

Formulation: part by mass

Materials used in Table 1 are shown below.
NR (natural rubber): TSR 20
EPDM (ethylene-propylene-diene rubber): ESPRENE (registered trademark) 505A manufactured by Sumitomo Chemical Co., Ltd.
SBR (styrene-butadiene rubber): JSR 1502 manufactured by JSR Corporation
HXNBR (hydrogenated carboxyl-modified acrylonitrile-butadiene rubber): Therban (registered trademark) XT VPKA 8889 (amount of acrylonitrile: 33.0 mass %, amount of double bond: 0.40 mmol/g, amount of monomer having carboxyl group: 5.0 mass %) manufactured by Lanxess Corporation
HNBR (hydrogenated acrylonitrile-butadiene rubber): Therban 3446 (amount of acrylonitrile: 34.0 mass %, amount of double bond: 0.49 mmol/g) manufactured by Lanxess Corporation
Sulfur: 5% oil treated sulfur fine powder (200 mesh) manufactured by Tsurumi Chemical Industry Co., Ltd.
NOCCELER (registered trademark) CZ: N-cyclohexyl-2-benzothiazolylsulfenamide manufactured by Ouchi Shinko Chemical Industry Co., Ltd.
NOCCELER NS: N-t-butyl-2-benzothiazolylsulfenamide manufactured by Ouchi Shinko Chemical Industry Co., Ltd.
SOXINOL D (DPG): 1,3-diphenylguanidine manufactured by Sumitomo Chemical Co., Ltd.
SANCELER TBzTD: tetrabenzylthiuram disulfide manufactured by Sanshin Chemical Industry Co., Ltd.
STRUKTOL ZP 1014: manufactured by Struktol Company
Stearic acid: beads stearic acid camellia manufactured by NOF Co., Ltd.
ULTRASIL VN3: manufactured by EVONIK Industries
DIABLACK N220: manufactured by Mitsubishi Chemical Corporation
SEAST SO (FEF): manufactured by Tokai Carbon Co., Ltd.
NOCRAC (registered trademark) NS-6: 2,2'-methylene bis (4-methyl-6-t-butylphenol) manufactured by Ouchi Shinko Chemical Industry Co., Ltd.
SANTOGARD PVI: N-cyclohexylthiophthalimide manufactured by Sanshin Chemical Industry Co., Ltd.
Benzoic acid: manufactured by Sigma-Aldrich Corporation
Diana Process Oil PA32: manufactured by Idemitsu Kosan Co., Ltd.

The unvulcanized rubber sheet having a fan shape for the outer layer and the unvulcanized cap member were prepared using the polar rubber composition or the nonpolar rubber. The outer layer rubber sheet was formed with a fixed thickness. The unvulcanized rubber sheet having a rectangular shape for the inner layer was prepared using the nonpolar rubber composition. The inner layer rubber sheet was formed with a thickness gradually becoming thicker from one end toward the other end. The inner layer rubber sheet was wound around a mandrel, the interlayer composition was applied to the entire surface of the inner layer rubber sheet, and then the outer layer rubber sheet was laminated and wound around the interlayer. The mandrel having these rubber sheets being wound therearound, and the cap member were charged into a mold having a groove pattern on the cavity surface thereof. The heat treatment was performed at a mold temperature of 160° C. for 15 minutes to obtain club golf grips. Evaluation results for each of the grips are shown in Table 2.

TABLE 2

| | | Grip No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Inner layer | Composition No. | a | | | | | a | | | b | c | d | a | |
| | Base rubber (nonpolar rubber) | NR, EPDM | | | | | NR, EPDM | | | NR | EPDM | SBR | NR, EPDM | |
| Inter-layer | System | — | — | Chlorinated rubber | | | Olefin rubber | | | | Olefin rubber | | Olefin rubber | |
| | Type | — | — | Chemlok 6125 | Chemlok 6225 | Chemlok 6108 | XJ-150 | Chemlok 233X | Chemlok 402X | | Chemlok 6108 | | Chemlok 6108 | |
| | MDI content | — | — | — | — | — | 2.2 | 3.6 | 3.5 | — | | | — | — |

TABLE 2-continued

| | | Grip No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Outer layer | (mass %) in composition | | | | | | | | | | | | | |
| | Composition No. | a | | A | | | A | | | | A | | B | C |
| | Base rubber | NR, EPDM | | HXNBR | | | HXNBR | | | | HXNBR | | HXNBR, HNBR | HNBR |
| | | Nonpolar rubber | | Polar rubber | | | Polar rubber | | | | Polar rubber | | Polar rubber | Polar rubber |
| Evaluation | Peeling strength | — | 100 | 1363 | 1304 | 981 | 1114 | 983 | 736 | 970 | 995 | 965 | 980 | 983 |
| | Tensile strength | 100 | 272 | 91 | 104 | 206 | 155 | 125 | 145 | 198 | 200 | 204 | 198 | 202 |

Chemlok (registered trademark) 6125: vulcanization adhesive including chlorinated rubber, manufactured by Lord Far East Inc.
Chemlok 6225: vulcanization adhesive including chlorinated rubber, manufactured by Lord Far East Inc.
Chemlok 6108: vulcanization adhesive including olefin rubber (CSM), manufactured by Lord Far East Inc.
XJ-150: vulcanization adhesive including olefin rubber (CSM), manufactured by Lord Far East Inc.
Chemlok 233X: vulcanization adhesive including olefin rubber (CSM), manufactured by Lord Far East Inc.
Chemlok 402X: vulcanization adhesive including olefin rubber (CSM), manufactured by Lord Far East Inc.

Grip No. 1 is the case not comprising a polar rubber layer, and shows low tensile strength. Grip No. 2 is the case not comprising an interlayer, and shows very low peeling strength between the polar rubber layer and the nonpolar rubber layer. Grips No. 3 and No. 4 are the case not containing the chlorosulfonated polyethylene in the interlayer, and shows high peeling strength between the polar rubber layer and the nonpolar rubber layer but low tensile strength. Grips No. 5 to No. 13 are the case containing the chlorosulfonated polyethylene in the interlayer, and shows high peeling strength between the polar rubber layer and the nonpolar rubber layer as well as high tensile strength.

This application is based on Japanese patent application No. 2014-222844 filed on Oct. 31, 2014, the content of which is hereby incorporated by reference.

The invention claimed is:

1. A golf club grip comprising a polar rubber layer and a nonpolar rubber layer,
wherein the polar rubber layer is formed from a rubber composition containing a base rubber including a polar rubber in an amount of 50 mass % or more,
the nonpolar rubber layer is formed from a rubber composition containing a base rubber including a nonpolar rubber in an amount of 50 mass % or more,
the polar rubber layer and the nonpolar rubber layer are laminated via an interlayer formed from an interlayer composition containing an olefin rubber,
wherein the polar rubber has a solubility parameter value (SP value) ($Pa^{1/2}$ (25° C.)) of 8.7 or more and 10.5 or less, and wherein the solubility parameter value is calculated according to a following mathematical formula (1):

$$SP\ value = (\Delta E/V)^{1/2} = (\Sigma \Delta ei/\Sigma \Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

2. The golf club grip according to claim 1, wherein the olefin rubber is a modified olefin rubber including a modified polyethylene in an amount ranging from 5 mass % to 15 mass %.

3. The golf club grip according to claim 1, wherein the interlayer composition contains 4,4'-diphenylmethane diisocyanate.

4. The golf club grip according to claim 1, wherein the polar rubber includes at least one diene rubber selected from the group consisting of an acrylonitrile-butadiene rubber (NBR), a carboxyl-modified acrylonitrile-butadiene rubber (XNBR), a hydrogenated acrylonitrile-butadiene rubber (HNBR), and a hydrogenated carboxyl-modified acrylonitrile-butadiene rubber (HXNBR).

5. The golf club grip according to claim 1, wherein the nonpolar rubber has a solubility parameter value (SP value) ($Pa^{1/2}$ (25° C.)) of 7.7 or more and less than 8.7, and wherein the solubility parameter value is calculated according to a following mathematical formula (1):

$$SP\ value = (\Delta E/V)^{1/2} = (\Sigma \Delta ei/\Sigma \Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

6. The golf club grip according to claim 1, wherein the rubber component of the interlayer composition contains the olefin rubber in an amount of 50 mass % or more.

7. The golf club grip according to claim 2, wherein the modified polyethylene is at least one selected from the group consisting of a chlorosulfonated polyethylene (CSM), a maleic acid modified ethylene-propylene rubber (M-EPM), and a chlorinated polyethylene rubber (CM).

8. The golf club grip according to claim 3, wherein the interlayer composition contains 4,4'-diphenylmethane diisocyanate in an amount of more than 0 mass % and 6 mass % or less.

9. The golf club grip according to claim 1, wherein the polar rubber layer is disposed as an outer layer, and the nonpolar rubber layer is disposed as an inner layer, and the interlayer is interposed between the outer layer and the inner layer.

10. A golf club comprising a shaft, a head provided on one end of the shaft, and a grip provided on another end of the shaft,
   wherein the grip is a golf club grip comprising a polar rubber layer and a nonpolar rubber layer, and
   wherein the polar rubber layer is formed from a rubber composition containing a base rubber including a polar rubber in an amount of 50 mass % or more,
   the nonpolar rubber layer is formed from a rubber composition containing a base rubber including a nonpolar rubber in an amount of 50 mass % or more,
   the polar rubber layer and the nonpolar rubber layer are laminated via an interlayer formed from an interlayer composition containing an olefin rubber,
   wherein the polar rubber has a solubility parameter value (SP value) ($Pa^{1/2}$ (25° C.)) of 8.7 or more and 10.5 or less, and wherein the solubility parameter value is calculated according to a following mathematical formula (1):

$$SP\ value=(\Delta E/V)^{1/2}=(\Sigma\Delta ei/\Sigma\Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

11. The golf club according to claim 10, wherein the olefin rubber is a modified olefin rubber including a modified polyethylene in an amount ranging from 5 mass % to 15 mass %.

12. The golf club according to claim 10, wherein the interlayer composition contains 4,4'-diphenylmethane diisocyanate.

13. The golf club according to claim 10, wherein the polar rubber includes at least one diene rubber selected from the group consisting of an acrylonitrile-butadiene rubber (NBR), a carboxyl-modified acrylonitrile-butadiene rubber (XNBR), a hydrogenated acrylonitrile-butadiene rubber (HNBR), and a hydrogenated carboxyl-modified acrylonitrile-butadiene rubber (HXNBR).

14. The golf club according to claim 10, wherein the nonpolar rubber has a solubility parameter value (SP value) ($Pa^{1/2}$ (25° C.)) of 7.7 or more and less than 8.7, and wherein the solubility parameter value is calculated according to a following mathematical formula (1):

$$SP\ value=(\Delta E/V)^{1/2}=(\Sigma\Delta ei/\Sigma\Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

15. The golf club according to claim 10, wherein the rubber component of the interlayer composition contains the olefin rubber in an amount of 50 mass % or more.

16. The golf club according to claim 11, wherein the modified polyethylene is at least one selected from the group consisting of a chlorosulfonated polyethylene (CSM), a maleic acid modified ethylene-propylene rubber (M-EPM), and a chlorinated polyethylene rubber (CM).

17. The golf club according to claim 12, wherein the interlayer composition contains 4,4'-diphenylmethane diisocyanate in an amount of more than 0 mass % and 6 mass % or less.

18. The golf club according to claim 10, wherein the polar rubber layer is disposed as an outer layer, and the nonpolar rubber layer is disposed as an inner layer, and the interlayer is interposed between the inner layer and the outer layer.

19. A golf club grip comprising a polar rubber layer and a nonpolar rubber layer,
   wherein the polar rubber layer is formed from a rubber composition containing a base rubber including a polar rubber in an amount of 50 mass % or more,
   the nonpolar rubber layer is formed from a rubber composition containing a base rubber including a nonpolar rubber in an amount of 50 mass % or more,
   the polar rubber layer and the nonpolar rubber layer are laminated via an interlayer formed from an interlayer composition containing an olefin rubber,
   wherein the nonpolar rubber has a solubility parameter value (SP value) ($Pa^{1/2}$ (25° C.)) of 7.7 or more and less than 8.7, and wherein the solubility parameter value is calculated according to a following mathematical formula (1):

$$SP\ value=(\Delta E/V)^{1/2}=(\Sigma\Delta ei/\Sigma\Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

20. The golf club grip according to claim 19, wherein the olefin rubber is a modified olefin rubber including a modified polyethylene in an amount ranging from 5 mass % to 15 mass %, and
   wherein the modified polyethylene is at least one selected from the group consisting of a chlorosulfonated polyethylene (CSM), a maleic acid modified ethylene-propylene rubber (M-EPM), and a chlorinated polyethylene rubber (CM).

21. The golf club grip according to claim 19, wherein the interlayer composition contains 4,4'-diphenylmethane diisocyanate in an amount of more than 0 mass % and 6 mass % or less.

22. A golf club comprising a shaft, a head provided on one end of the shaft, and a grip provided on another end of the shaft,
   wherein the grip is a golf club grip comprising a polar rubber layer and a nonpolar rubber layer, and
   wherein the polar rubber layer is formed from a rubber composition containing a base rubber including a polar rubber in an amount of 50 mass % or more,
   the nonpolar rubber layer is formed from a rubber composition containing a base rubber including a nonpolar rubber in an amount of 50 mass % or more,
   the polar rubber layer and the nonpolar rubber layer are laminated via an interlayer formed from an interlayer composition containing an olefin rubber, and
   wherein the nonpolar rubber has a solubility parameter value (SP value) ($Pa^{1/2}$ (25° C.)) of 7.7 or more and less than 8.7, and wherein the solubility parameter value is calculated according to a following mathematical formula (1):

$$SP\ value=(\Delta E/V)^{1/2}=(\Sigma\Delta ei/\Sigma\Delta vi)^{1/2} \quad (1)$$

in the formula (1), $\Delta E$ represents vaporization energy, V represents mole volume, $\Delta ei$ represents vaporization energy of an atom or an atomic group, and $\Delta vi$ represents mole volume of an atom or an atomic group.

23. The golf club according to claim 22, wherein the olefin rubber is a modified olefin rubber including a modified polyethylene in an amount ranging from 5 mass % to 15 mass %, and
   wherein the modified polyethylene is at least one selected from the group consisting of a chlorosulfonated polyethylene (CSM), a maleic acid modified ethylene-propylene rubber (M-EPM), and a chlorinated polyethylene rubber (CM).

24. The golf club according to claim 22, wherein the interlayer composition contains 4,4'-diphenylmethane diisocyanate in an amount of more than 0 mass % and 6 mass or less.

* * * * *